Feb. 16, 1926. 1,573,314
E. GOLDBERG ET AL
ENLARGING CAMERA
Filed Jan. 3, 1925 4 Sheets-Sheet 4

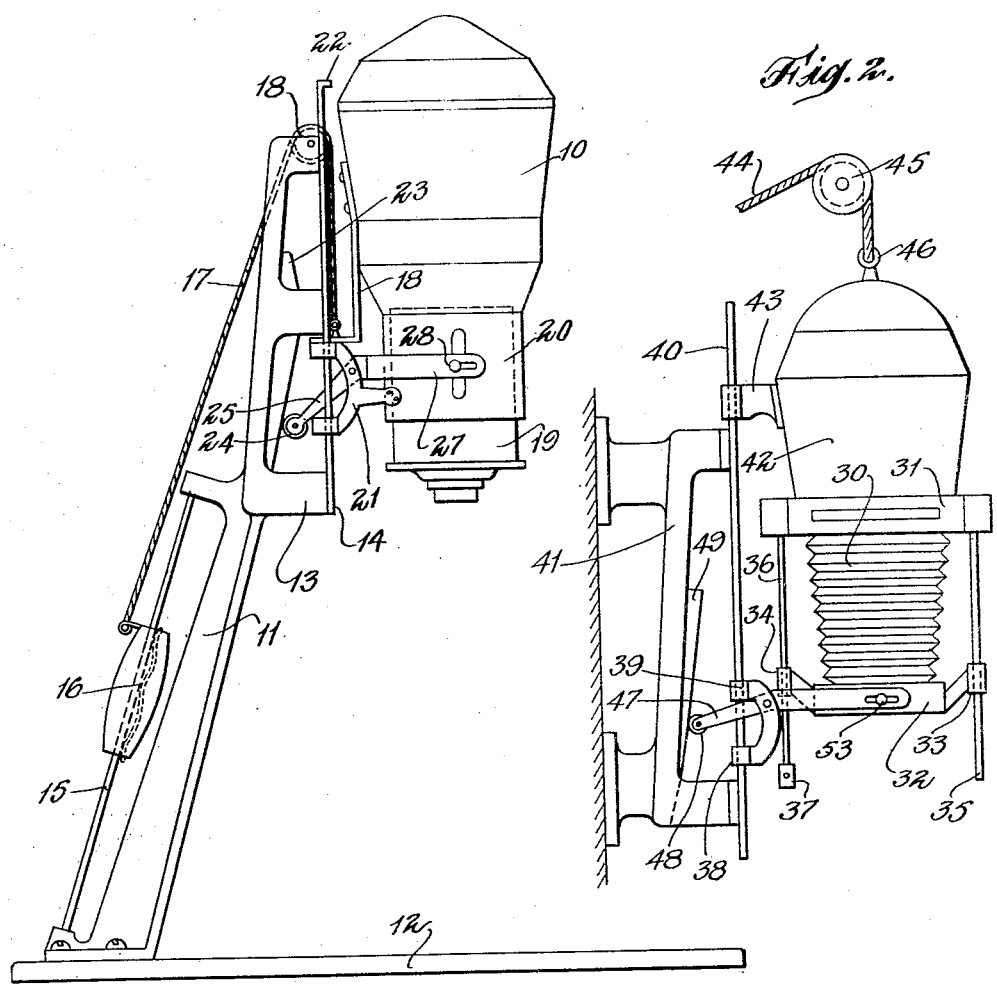

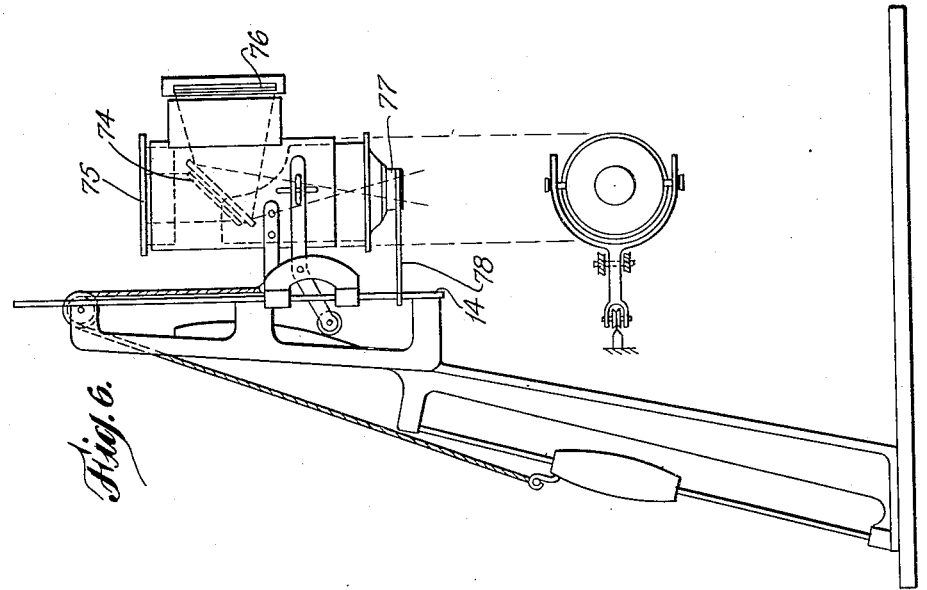
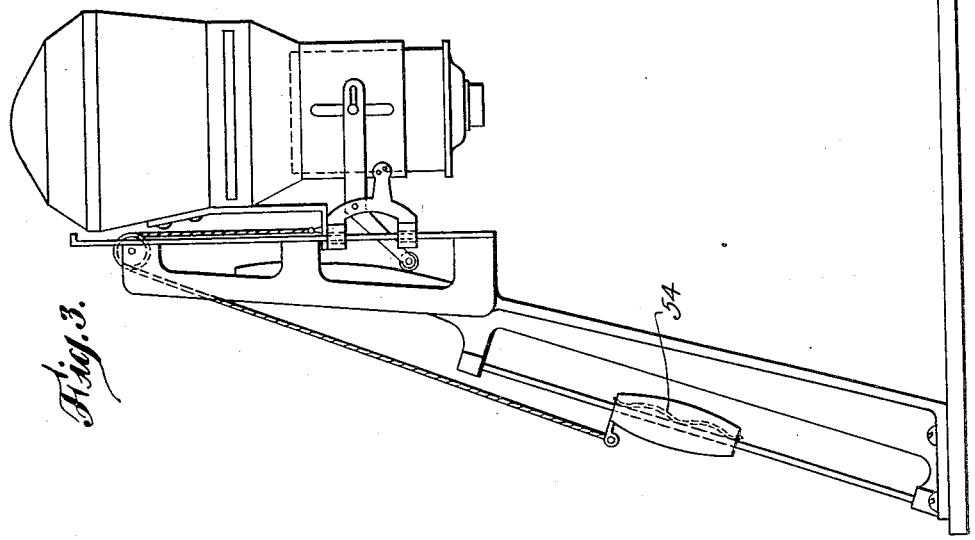

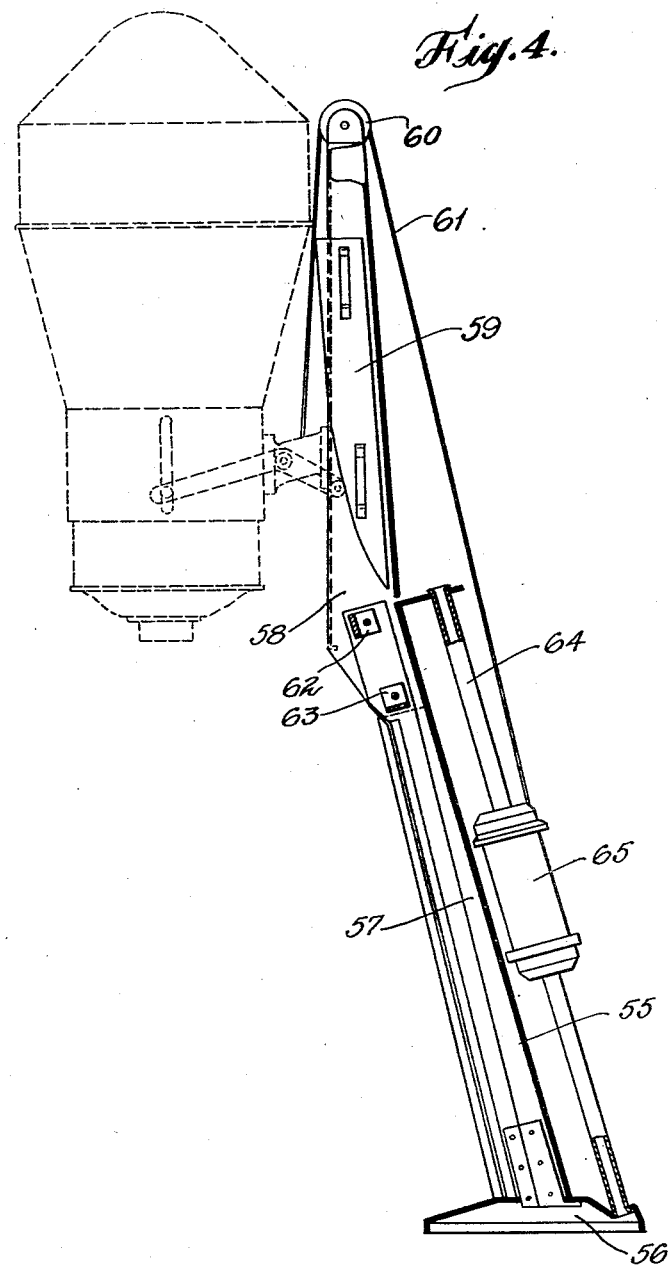

Inventor
Emanuel Goldberg
Martin Nowicki
By their Attorney Geo. C Heinsing

Patented Feb. 16, 1926.

1,573,314

UNITED STATES PATENT OFFICE.

EMANUEL GOLDBERG AND MARTIN NOWICKI, OF DRESDEN, GERMANY.

ENLARGING CAMERA.

Application filed January 3, 1925. Serial No. 444.

*To all whom it may concern:*

Be it known that Prof. Dr. EMANUEL GOLDBERG, Dresden, MARTIN NOWICKI, Dresden, citizens of Germany, residing at Dresden, Saxony, Germany, have invented certain new and useful Improvements in Enlarging Cameras, of which the following is a specification.

The present invention relates to improvements in cameras, particularly enlarging cameras, and it is the principal object of the invention to provide an operating lever or control for the ready and positive determination of the size of the picture, and to arrange this control lever in such a manner that the point of application of the leverage is located within an area determined by the circumference of the objective tube telescopically arranged within the projector casing.

The object of the present invention is particularly adapted for use with enlarging cameras with vertical optical axis and which are displaceably arranged in a vertical sense on a frame secured to a table or fastened to a wall.

In the customary enlarging cameras the objective casing has the form of a bellows and the displacement of the objective is effected by means of means arranged at the bottom, which arrangement shows the disadvantage that the folding of the bellows is irregular and frequently impeded so that the objective assumes an angular position so that consequently an inaccurate picture is produced.

The object of the present invention overcomes this disadvantage by the arrangement of the control lever as above stated and in combination with an objective tube telescopically arranged within the projector casing allowing the application of a control lever which is fork-shaped at one of its ends. Moreover the objective tube may cheaply be made from tin which evidently is better adapted to withstand wear and tear than a leather bellows.

Another object of the invention is the provision of an enlarging camera for artificial light suspended from a rope or the like in which the regulation is effected instead by a lever by a weight which has the shape of a handle and is used as a counterweight for the apparatus.

A further object of the invention is the provision of an enlarging camera adapted to be suspended from a frame of U-shaped cross-section consisting of three main parts the upper of which is removably secured to the others and the hollow body of which is closed by a novel top plate.

A still further object of the invention is the provision of an enlarging camera adapted to be suspended from a cable controlled by means of a lever connected with said cable and arranged on the apparatus table or enlarging easel.

It is also one of the objects of the invention to provide an apparatus of this kind with dark colored projecting surface adapted to absorb the picture rays.

The invention furthermore relates to improvements in enlarging cameras equipped with a refractor mirror having the part of the camera located between mirror and objective telescopically formed.

These and other objects and advantages of our invention will become more fully known as the description thereof proceeds, and will then be specifically pointed out in the appended claims.

In the accompanying drawings, forming a material part of this disclosure:

Figure 1 is a side elevation of an enlarging camera constructed according to the present invention and equipped with our novel control lever.

Figure 2 is a side elevation of a modified form of camera also equipped with our novel control lever.

Figure 3 is a side elevation of another modification.

Figure 4 is a side elevation of a novel frame for an enlarging camera constructed according to the present invention.

Figure 6 is a side elevation of a still further modification of our novel enlarging camera equipped with a refractor mirror.

Figure 5:
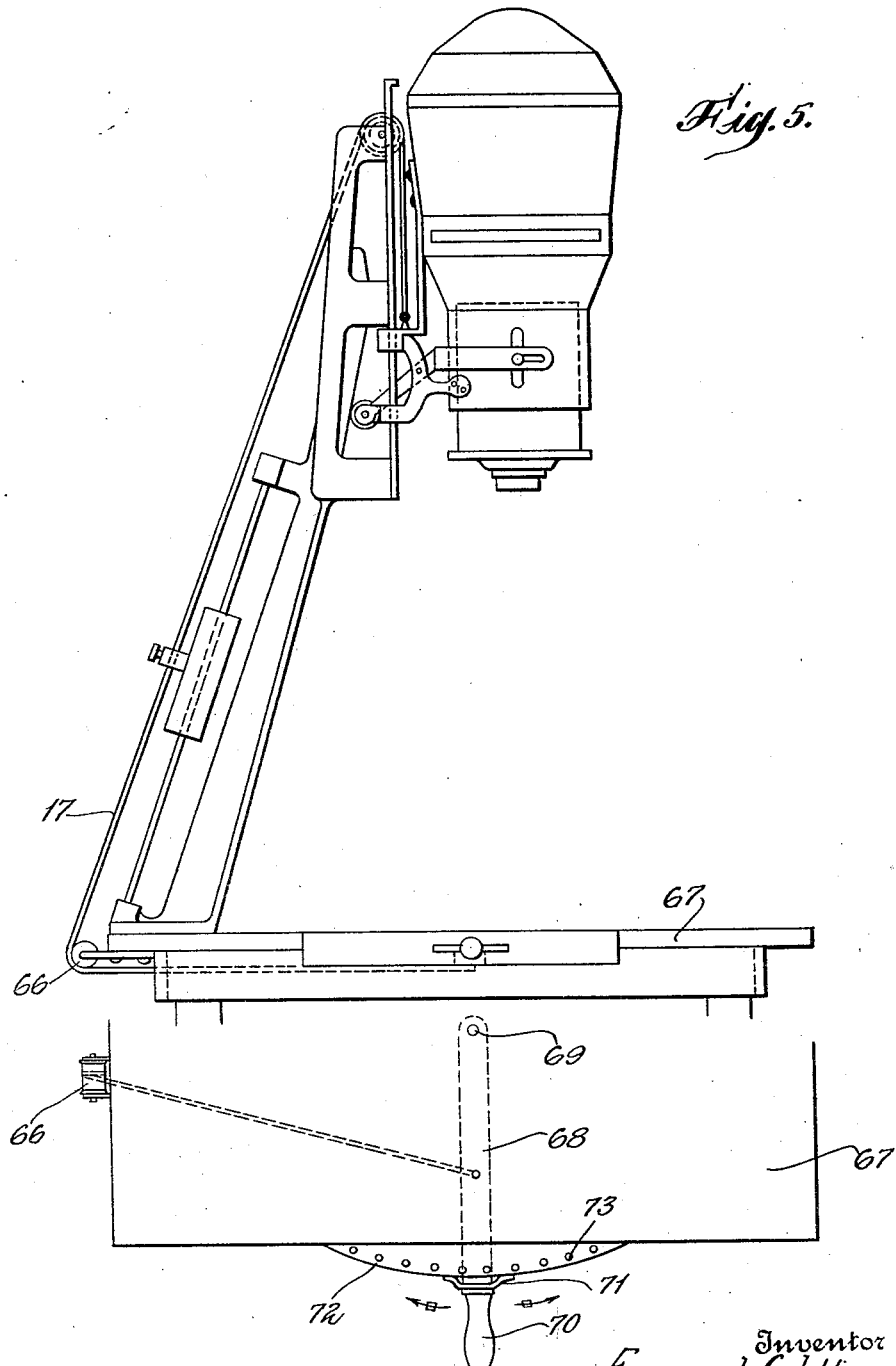
Figure 5 is a side elevation of another modification of our invention illustrating a lever operated cable control.

As shown in Figure 1, the enlarging camera 10 is suspended from a frame 11 having its foot part secured to a table 12 and carrying a head 13 equipped with a guide rod 14 on its front face. The frame 11 has spaced therefrom a parallel bar 15 secured at its ends in suitable bosses of the frame on which a counterweight 16 for the camera is displaceably guided to which is attached one end of a cable 17 or the like guided over rollers 18 suitably journaled on the frame.

The other end of the cable 17 is attached to a bracket 18 having one of its arms attached to the camera 10 as shown in Figure 1.

The objective tube, preferably made from metal, as for instance tin etc. and designated 19, is telescopically displaceable in the camera casing 20.

This casing is guided by means of a bracket 21 secured with one of its arms to the casing and having its other arm fork-shaped and rolled into sockets adapted to receive rod 14 and to guide up and down on the same. The rod 14 carries at its extreme upper end a stop lug 22 or the like to limit the upward movement of the camera.

The frame head carries a cam face 23 along which a roller 24 is guided which is formed at one end of an articulated trip lever 25, the other end of which is forked to form the curved prongs or arms 26, 27 which are perforated near their ends for the passage of bolts 28 and 29 passing through slots in the camera casing and which are secured to the tube 19 at their inner ends telescoping into said casing.

It will be clear that in this manner the leverage application point is located within an area limited by the circumference of the objective casing, thus permitting a quick and positive adjustment of the size of the picture and avoiding all distortion and tilting of the objective in order to ensure at all times a perfect and correct picture.

In the modification of the invention illustrated in Figure 2 the objective casing has the customary form of a bellows as indicated at 30 arranged between an upper plate 31 and a lower plate 32. The lower plate 32 is displaceably guided against the upper plate 31 by means of sleeves 33 and 34 connected to plate 32 and gliding along lateral guide rods 35 and 36 depending from the ends of plate 31.

A bracket 37 is secured at one end to the rod 36 and has its other arms formed into sockets 28, 39 adapted to slide along a vertical rod 40 attached to the head 41 of the frame, and the camera casing 42 is at one side equipped with a guide socket 43 vertically displaceable on rod 40, while the end of cable 44 is guided over a roller 45 and secured to an eye 46 on top of the camera.

An articulated trip lever 47 carries at one end a roller 48 adapted to run over a cam face 49 on head 41, while the other end of the lever 47 is forked to form perforated prongs 50, 51 through which bolts 52, 53 pass securing the lever ends to the plate 32.

The operation of this form of the device is the same as described above, and it will be clear that also here the point of leverage application is located within an area marked c—d on the drawing limited by the circumference of the objective casing, thus ensuring at all times a positive and exact focus.

The modification illustrated in Figure 3 is identical with the form described and shown with respect to Figure 1, with the exception that the weight 16 is formed into a convenient handle. The arrangement of the counterweight on a rigid rod 15 will avoid all swinging or pendulum action of the cable. Furthermore in this form of our invention the counterweight 16 is hollow and adapted for the reception of a spring 54 allowing an adjustment of the apparatus to every desired height and locking of the parts in their adjusted position.

The modification illustrated in Figure 4 shows a frame 55 made of metal as for instance tin and having a substantial U-shaped cross-section. This frame is made in three parts, a foot 56, a lower standard 57, and an upper post 58 carrying the cam face 59 and the guide rollers 60 for the cable 61 from which the apparatus is suspended in the above described manner. Post 58 and standard 57 are removably connected as indicated at 62 and 63 in any well known manner, while the foot part 56 is solidly attached to standard 57.

This standard carries also spaced therefrom a parallel rod or bar 64 on which a casing 65 is displaceably guided which may be filled with shot or small metal balls or the like in order to give the casing the necessary weight to counterbalance the camera.

In the modified form illustrated in Figure 5, the end of the cable 17 is not attached to the weight, but guided over a roller 66 at the end of a table 67 and is then attached to a lever 68 pivotally secured at its inner end as at 69 to lower face of the table while its outer end carries a handle 70 and a collar 71 adapted to glide along a curved cam face 72 on the table which is provided with a plurality of perforations 73 for the reception of pegs or the like in order to secure and lock the lever in any of its adjusted positions.

In the modified form of our invention illustrated in Figure 6, the construction is in general the same as described with respect to Figure 1 with the exception that a refractor mirror 74 is arranged within the apparatus which is equipped with a removable cover 75 allowing a ready exchange of the mirror, and that the plate holder 76 is laterally disposed to the casing. The objective 77 carries a horizontal rod 78 adapted to slide with its free end in a slot of the vertical guide rod 14. This rod 78 can be removed in the lowest and highest positions of the camera, and the objective is then adjusted by hand.

The part of the camera between mirror and objective is formed telescopically and the rays are subjected to a refraction of 90°.

It will be clear that changes may be made in the general arrangement of our apparatus and in the construction of its minor details, such as fall within the scope defined in the appended claims without departing from the spirit of the invention.

Having thus described our invention, what we claim as new is:

1. Enlarging camera comprising a telescopic objective tube provided with slots in its outer mantle, a frame, means for suspending said camera from said frame, a counterweight for said camera, a cam surface on said frame, an articulated trip lever, a roller at one end of said lever engaging the said cam surface, the opposite end of said lever fork-shaped and provided with perforations, and means passed through the perforations into engagement with said tube so that the point of leverage application is located within an area limited by the outer circumference of the objective tube for ensuring accurate focusing and the production of a positively accurate enlargement picture.

2. Enlarging camera comprising a telescopic objective tube made of metal, a frame secured to a table or support, a head on said frame, a guide rod vertically disposed on said head, a bracket secured to said camera sliding and guided along said rod, a cable, a counterweight sliding on said frame to which one end of said cable is attached, the other end of which is attached to the camera, a cam face on said head, a telescopic objective tube, a slotted mantle for said tube, an articulated trip lever, a roller at one end of said lever in engagement with said cam face, a fork at the opposite end of said lever having perforations near the outer ends of the prongs of said fork, and means passed through the perforations of said prongs and the slots of said mantle engaging said tube for locating the point of leverage application within an area determined by the circumference of the objective tube for positively ensuring the production of an absolutely correct picture.

3. Enlarging camera comprising a frame, a support for said frame, a means for suspending said camera from said frame allowing a vertical displacement of the same, a rod spaced and parallel to said frame and secured thereon, a counterweight sliding on said rod to form a handle, to which one end of said suspension means is secured, and means including a telescopic metal tube objective holder for accurately focusing by locating the point of application of the leverage of said focusing means within an area limited by the outer circumference of the telescopic metal tube for ensuring at all times the taking of an accurate picture.

4. The combination of an enlarging camera with a refractor mirror, a telescoping objective tube and a plate holder laterally disposed thereto so that a refraction of the rays is effected for 90°, a means for suspending said camera for vertical displacement, and a lever means for guiding said camera during its displacement having its point of leverage application located within an area limited by the circumference of the objective tube for producing at all times an absolutely true, accurate and correct picture.

In testimony whereof we affix our signatures.

Professor Dr. EMANUEL GOLDBERG.
MARTIN NOWICKI.